(12) United States Patent
Smith et al.

(10) Patent No.: US 12,432,715 B2
(45) Date of Patent: Sep. 30, 2025

(54) AUTOMATIC DETERMINATION OF COMPONENTS FOR TIME SENSITIVE NETWORKING

(71) Applicant: Cisco Technology, Inc., San Jose, CA (US)

(72) Inventors: Malcolm Muir Smith, Richardson, TX (US); Maik Guenter Seewald, Nuremberg (DE); Sanjay Katabathuni, Fremont, CA (US)

(73) Assignee: Cisco Technology, Inc.

( * ) Notice: Subject to any disclaimer, the term of this patent is extended or adjusted under 35 U.S.C. 154(b) by 422 days.

(21) Appl. No.: 18/167,268

(22) Filed: Feb. 10, 2023

(65) Prior Publication Data

US 2024/0276481 A1    Aug. 15, 2024

(51) Int. Cl.
   *H04W 72/1263*  (2023.01)
   *H04W 72/563*   (2023.01)

(52) U.S. Cl.
   CPC ..... *H04W 72/1263* (2013.01); *H04W 72/563* (2023.01)

(58) Field of Classification Search
   None
   See application file for complete search history.

(56) References Cited

U.S. PATENT DOCUMENTS

| | | |
|---|---|---|
| 2015/0365338 A1 | 12/2015 | Pannell |
| 2020/0259896 A1 | 8/2020 | Sachs et al. |
| 2022/0046462 A1 | 2/2022 | De Andrade Jardin et al. |
| 2023/0075864 A1* | 3/2023 | Elazzouni .......... H04L 47/2416 |
| 2024/0090011 A1* | 3/2024 | Smith ................. H04W 72/542 |
| 2024/0188051 A1* | 6/2024 | Cavalcanti ........ H04W 28/0268 |

FOREIGN PATENT DOCUMENTS

| | | |
|---|---|---|
| CN | 112087804 A | 12/2020 |
| CN | 112969230 B | 10/2021 |
| CN | 114268550 A | 4/2022 |

OTHER PUBLICATIONS

Zhao, Luxi et al.; "Worst-Case Latency Analysis for IEEE 802.1Qbv Time Sensitive Networks Using Network Calculus" Digital Object Identifier 10.1109/ACCESS.2018.2858767; IEEE 802.1Qbv TSNs Using Network Calculus; vol. 6 2018 (13 pages).
International Search Report and Written Opinion for International Application No. PCT/US2024/015122, mailed May 15, 2024, 13 Pages.

* cited by examiner

*Primary Examiner* — Anh Vu H Ly
(74) *Attorney, Agent, or Firm* — Merchant & Gould P.C.

(57) ABSTRACT

The automatic determination of components for Time Sensitive Networking (TSN), and more specifically the automatic determination of the Gate Duration (GD) and Guard Band (GB) for TSN may be provided. To determine the GB and/or GD for a TSN gate, a Time Error (TE) may be determined, and TSN components may be received. An Access Category (AC) and a per-AC Enhanced Distributed Channel Access (EDCA) state may be determined using the TID, wherein the per-AC EDCA includes a Contention Window (CW) minimum. Next, an Arbitration Interframe Space Number (AIFSN) of an upcoming data unit is determined using the using the AC and per-AC EDCA. The GB may be determined based on the AIFSN, the CW minimum, and the TE. The Gate Duration (GD) may be determined based on the TE and calculating a number of symbols in a MAC Protocol Data Unit (MPDU) and the upcoming data unit.

20 Claims, 5 Drawing Sheets

AUTOMATIC DETERMINATION OF COMPONENTS FOR TIME SENSITIVE NETWORKING

TECHNICAL FIELD

The present disclosure relates generally to providing the automatic determination of components for Time Sensitive Networking (TSN), and more specifically providing the automatic determination of the Gate Duration (GD) and Guard Band (GB) for TSN.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

The automatic determination of components for Time Sensitive Networking (TSN), and more specifically the automatic determination of the Gate Duration (GD) and Guard Band (GB) for TSN may be provided. To determine the GB and/or GD for a TSN gate, a Time Error (TE) may be determined. TSN components may then be received, the TSN components including a Traffic Identifier (TID). An Access Category (AC) and a per-AC Enhanced Distributed Channel Access (EDCA) state may be determined using the TID, wherein the per-AC EDCA includes a Contention Window (CW) minimum. Next, an Arbitration Interframe Space Number (AIFSN) of an upcoming data unit is determined using the using the AC and per-AC EDCA. The GB may be determined based on the AIFSN, the CW minimum, and the TE. The Gate Duration (GD) may be determined based on the TE and calculating a number of symbols in a MAC Protocol Data Unit (MPDU) and the upcoming data unit.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The Institute of Electrical and Electronics Engineers (IEEE) standard 802.1Qbv addresses Time Sensitive Networking (TSN), including traffic scheduling that may separate communication via the network into fixed length, repeating time cycles. The cycles may allow communications to be sent at an exclusive time period for the particular communication assigned the cycle. The scheduler may add a Guard Band (GB) before time slices that carry time-critical traffic (e.g., traffic scheduled to use at least a portion of a time cycle). During the GB, no new transmissions may be initiated. However, ongoing transmissions may continue transmitting during the GB if the transmission has not completed.

For example, the IEEE standard 802.1Qbv calls for a Central Network Controller (CNC) that may set the GB. The CNC may also set the time when Enhanced Distributed Channel Access (EDCA) lock-out must guarantee no Physical Layer Protocol Data Units (PPDU) are being transmitted. However, the CNC may have no specific knowledge of the wireless medium and thus what minimum time for the GB may be required, including any time errors for example. Therefore, current systems and methods may be unable to automatically determine components for TSN, such as the GB and the Gate Duration (GD) and may set GB's of too short and/or too long in length.

Figure 1:
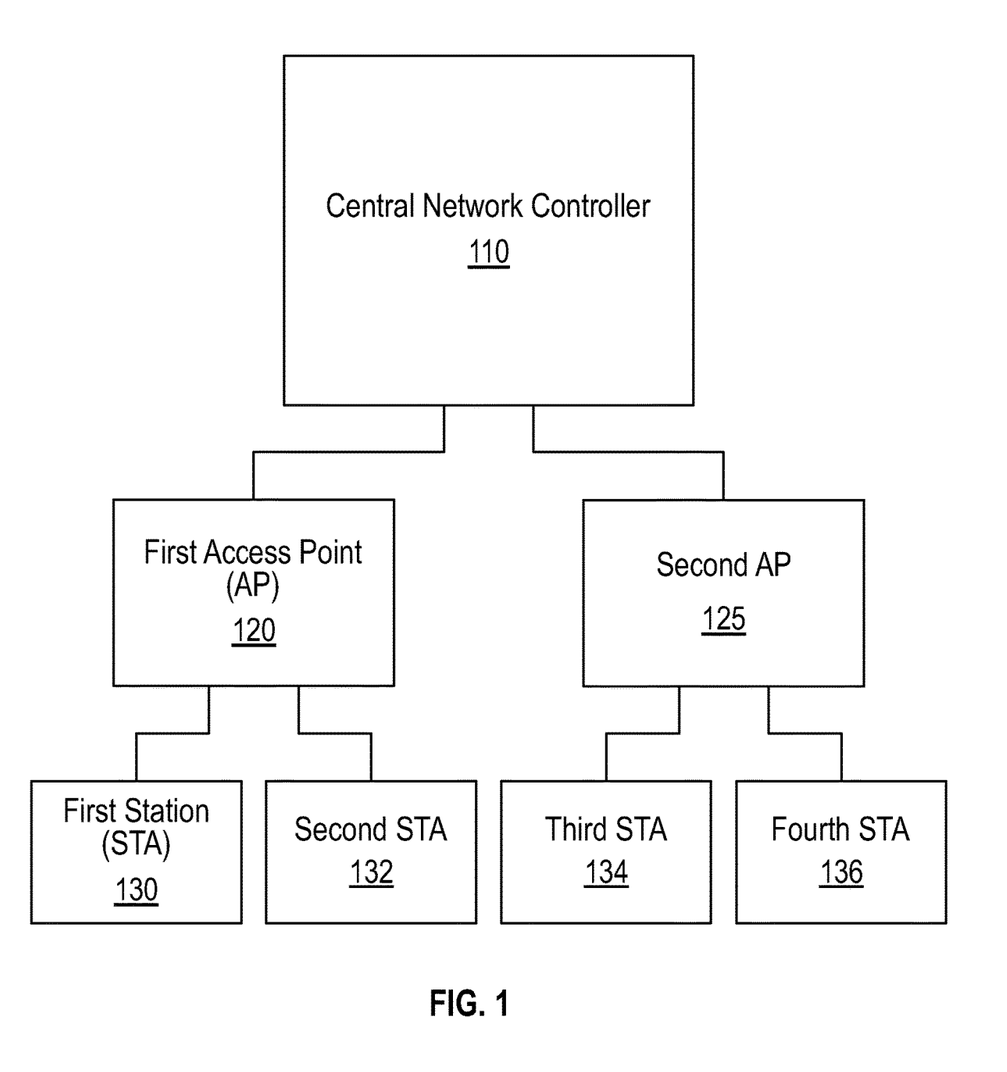
FIG. 1 is an operating environment for a Central Network Controller (CNC)

FIG. 1 is an operating environment 100 for a CNC 110. The operating environment 100 may include the CNC 110, a first Access Point (AP) 120, a second AP 125, a first Station (STA) 130, a second STA 132, a third STA 134, and a fourth STA 136. The CNC 110 may be any system that controls or otherwise operates a network (e.g., a Wireless Local Area Network (WLAN) controller). The CNC 110 may control the operation of the first AP 120, the second AP 125, the first Station (STA) 130, the second STA 132, the third STA 134, and/or the fourth STA 136. For example, the CNC 110 may control the time at which the first AP 120, the second AP 125, the first Station (STA) 130, the second STA 132, the third STA 134, and/or the fourth STA 136 may send transmissions via the network.

The CNC 110 may determine components for TSN, including the GB and/or GD for example. The first AP 120 and/or the second AP 125 may determine components for TSN in other examples. However, the operations for determining components for TSN may be described as being performed by the CNC 110 herein. The CNC 110 may use the specification established by the standard used for TSN (e.g., the IEEE standard 802.1Qcc and/or 802.1Qdj) to determine established components. The established components may include the Scheduling Interval (SI), the Start Time (ST), the Traffic ID (TID), the Media Access Control (MAC) Service Data Unit (MSDU) size, and/or the like. In an example, the CNC may use a TSN interface (e.g., the TSN interface described by the IEEE standard 802.1Qdj) to access or otherwise determine the established components for TSN. The CNC 110 may then predict a Time Error (TE) and determine the remaining components (e.g., the GB, GD) based on the TE.

The CNC 110 may estimate or otherwise determine the TE using network standards (e.g., the IEEE standard 802.1AS outlining bi-directional time synchronization). The network standard may detail sources and measurements for error. For example, TE may include timestamp error, error between a clock source and a clock master, time changes such as when the network reconfigures, and/or the like. In an example, the CNC 110 may determine the TE to be 10 microseconds.

The CNC 110 may evaluate the status of the network to predict the GB and/or GD for upcoming TSN time-slots used to transmit data by first determining an Access Category (AC) using the determined TID class of the associated traffic to be transmitted in the time-slot. When the CNC 110 determines the AC, the CNC 110 may additionally determine a per-AC EDCA state (e.g., Arbitration Inter-Frame Spacing (AIFS), Contention Window (CW) minimum and/or maximum (CWmin/max), remaining Backoff (BO), etc.). The CNC 110 may use the CW, including the CWmin and CWmax for example, to compute the GB. The CW may be constrained to be within CWmin and CWmax. The CNC 110 may use the AC and/or the per-AC EDCA state to determine the Arbitration Interframe Space Number (AIFSN) of the associated upcoming PPDU and/or the backoff counter expiration.

The TSN standard (e.g., the IEEE standard 802.1Qbv) may dedicate an AC to TSN traffic, and MSDUs received for a TSN gate may never be retried past an assigned Transmission Opportunity (TXOP) the MSDUs were scheduled for, the CNC 110 may determine that other non-TSN ACs can be inhibited by the EDCA lock-out mechanism. Thus, BO timers may not expire within the TSN gate. The CNC 110 may therefore determine the GB by adding the currently configured CWmin value (e.g., 2,4,8 slots) to the AIFSN (e.g., 2 slots) for the total required time (e.g. the GB is 4 slots and each slot is sixteen microseconds, so the GB is 64 microseconds). The CNC 110 may determine that the first AP 120 and/or the second AP 125 can transmit at the end of the determined GB.

The TSN standard (e.g., the IEEE standard 802.1Qbv) may support one MSDU per gate, so MSDU and MAC Protocol Data Unit (MPDU) aggregation (AMSDU/AMPDU) may be disabled or otherwise not in effect during a TSN TXOP. Thus, the CNC 110 may calculate the number of symbols in a MPDU and/or PPDU using the current Physical layer (PHY) mode, the current STA data-rate (for Uplink (UL) and/or Downlink (DL) as appropriate depending on the direction of the transmission), and the current MAC protocol (e.g., the IEEE standard 802.11be, 802.11eht, etc.). For example, the CNC 110 may add together the MSDU/data-rate, MAC header, padding, and/or the like to determine the number of symbols in the MPDU and/or PPDU. To account for any MPDU retries, the CNC 110 may leverage the historical PHY Packet Error Ratio (PER) rate to estimate the probability of any number of retries (e.g., zero retries, one retry, two retries, etc.). The CNC 110 may add a retry buffer into the determined length of the GD (e.g., two times the length, three times the length).

In another example, the CNC 110 may cause the STA and/or the AP that is transmitting to continue the TXOP via MPDU and no ACK SIFS cycles instead of adding the retry buffer to the GD. Causing the device to continue the TXOP may defer transmissions for other TSN gates, but the CNC 110 may include an auxiliary GB for one or more retries to avoid scheduling over other gates.

The operations the CNC 110 performs to determine the GB and/or GD may allow the CNC 110 to reduce transmission delays and/or jitter. The CNC 110 may reduce delays and/or jitter by determining the shortest GB and/or GD while accounting for the time transmissions are expected to take to prevent interference on other transmissions. The CNC 110 may account for network delay sources (e.g., Wi-Fi delay sources) when determining the GB and/or GD.

In some examples, the CNC 110 may compute a GB and/or GD for each upcoming TSN slot. In other examples, the CNC 110 may estimate a GB and/or GD for use in multiple upcoming TSN slots and periodically update the GB and/or GD. The CNC 110 may also assign GBs and/or GDs to similar TSN and non-TSN gates compared to the slots used to estimate the GB and/or GD. For example, when a slot has the same TID class, AP class, and/or STA class as a computed GB and/or GD, the CNC 110 may assign the associated GB and/or GD to the slot. The CNC 110 may observe the BO counter terminal value and/or channel utilization for the TSN TID and use the values to determine the GB. The CNC 110 may use a Modulation Coding Scheme (MCS) observation of the transmitting device (e.g., the first AP 120, the second AP 125, the first STA 130, the second STA 132 the third STA 134, the fourth STA 136) to compute the GD.

Figure 2:
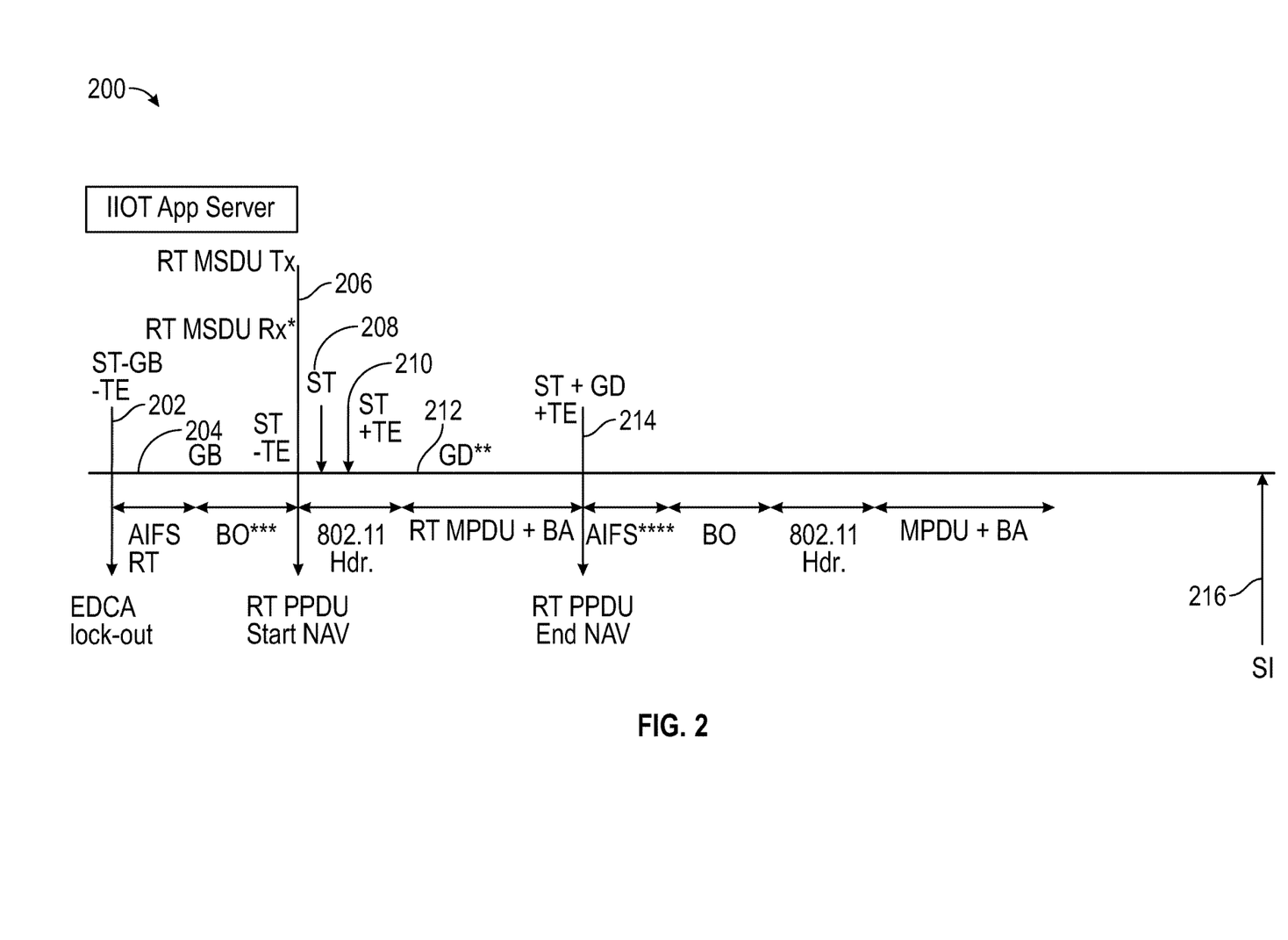
FIG. 2 is a timing diagram for Time Sensitive Networking (TSN)

FIG. 2 is a timing diagram 200 for TSN. The timing diagram 200 may include a gate Start Time (ST) minus GB minus TE 202, a GB 204, a gate ST minus TE 206, a gate ST 208, a gate ST plus TE 210, a GD 212, a gate ST plus GD plus TE 214, and a Scheduling Interval (SI) 216. The GB 204 may be between the ST minus GB minus TE 202 and the ST minus TE 206. The GD 212 may be between the ST minus TE 206 and the ST plus GD plus TE 214.

The CNC 110 may determine the GB 204 and/or the GD 212 by first determining the TE. Next, the CNC 110 may receive or otherwise determine the SI 216, the gate ST 208, the TID, and the MSDU size (e.g., using the IEEE standard 802.1Qdj). The CNC 110 may then determine the AIFSN of the PPDU to be transmitted in the timing diagram 200 and/or the BO counter expiration using the TID to determine the AC and the per-AC DCA state. The CNC 110 may determine the GB 204 by adding the CWmin value to the AIFSN. The CNC 110 may determine the GD 212 by calculating the number of symbols in a MPDU and/or PPDU to be transmitted in the timing diagram 200 (e.g., MSDU/data rate+MAC header+padding+etc.). The CNC 110 may account for transmission retries by estimating the probability for any number of retries using the historical PHY PER rate and add a retry buffer based on the estimated probabilities. Alternatively, the CNC 110 may cause the transmitting device to continue the TXOP via MPDU and/or no ACK SIFS cycles and not add a retry buffer. The CNC 110 may also include an auxiliary GB for one or more potential retry attempts.

Figure 3:
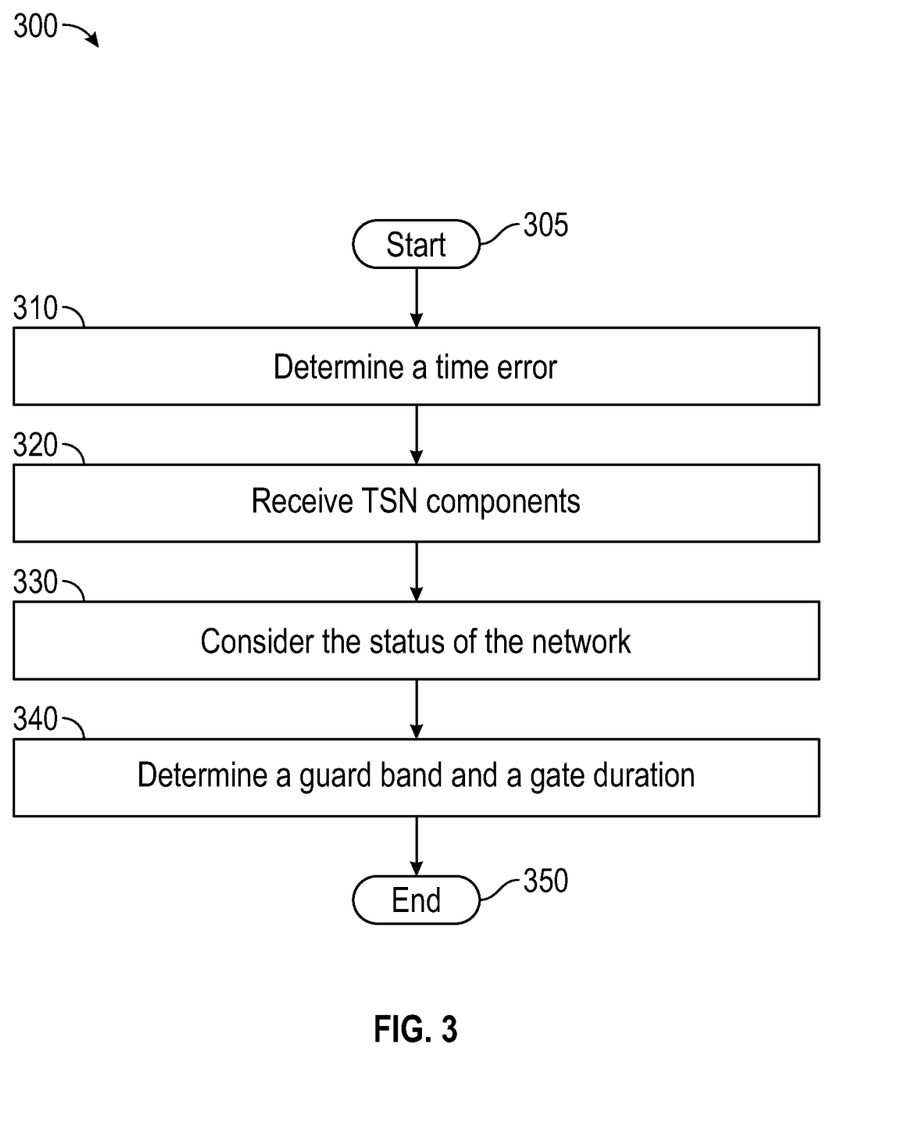
FIG. 3 is a flow chart of a method for determining the components for TSN.

FIG. 3 is a flow chart of a method 300 for determining the components for TSN. The method 300 may begin at starting block 305 and proceed to operation 310. In operation 310, TE may be determined using bi-directional time synchronization. For example, the CNC 110 determine the TE using the IEEE standard 802.1AS outlining bi-directional time synchronization.

In operation 320, TSN components may be received. The TSN components may include any of (i) a SI, (ii) a ST, (iii) a TID, (iv) a size of a data unit, or (v) any combination of (i)-(iv). The CNC 110 may receive or otherwise determine the components according to the IEEE standard 802.1Qbv.

In operation 330, the status of the network may be considered. For example, the CNC 110 may evaluate the status of the network by determining the AC and the per-AC EDCA state using the TID, wherein the per-AC EDCA includes a CW minimum. The CNC 110 may also determine the AIFSN of an upcoming data unit (e.g., PPDU) using the using the AC and per-AC EDCA.

In operation 340, the GB and GD may be determined. The GB and the GD may be determined based on the TE, the traffic specifications, and the status of the network. For example, the CNC 110 may determine the GB based on the AIFSN, the CW minimum, and the TE and/or by performing the operations described above with respect to FIG. 1 and FIG. 2. The CNC 110 may determine the GD based on the TE and calculating a number of symbols in a MAC Protocol Data Unit (MPDU) and the upcoming data unit and/or by performing the operations described above with respect to FIG. 1 and FIG. 2. The method 300 may conclude at ending block 350.

Figure 4:
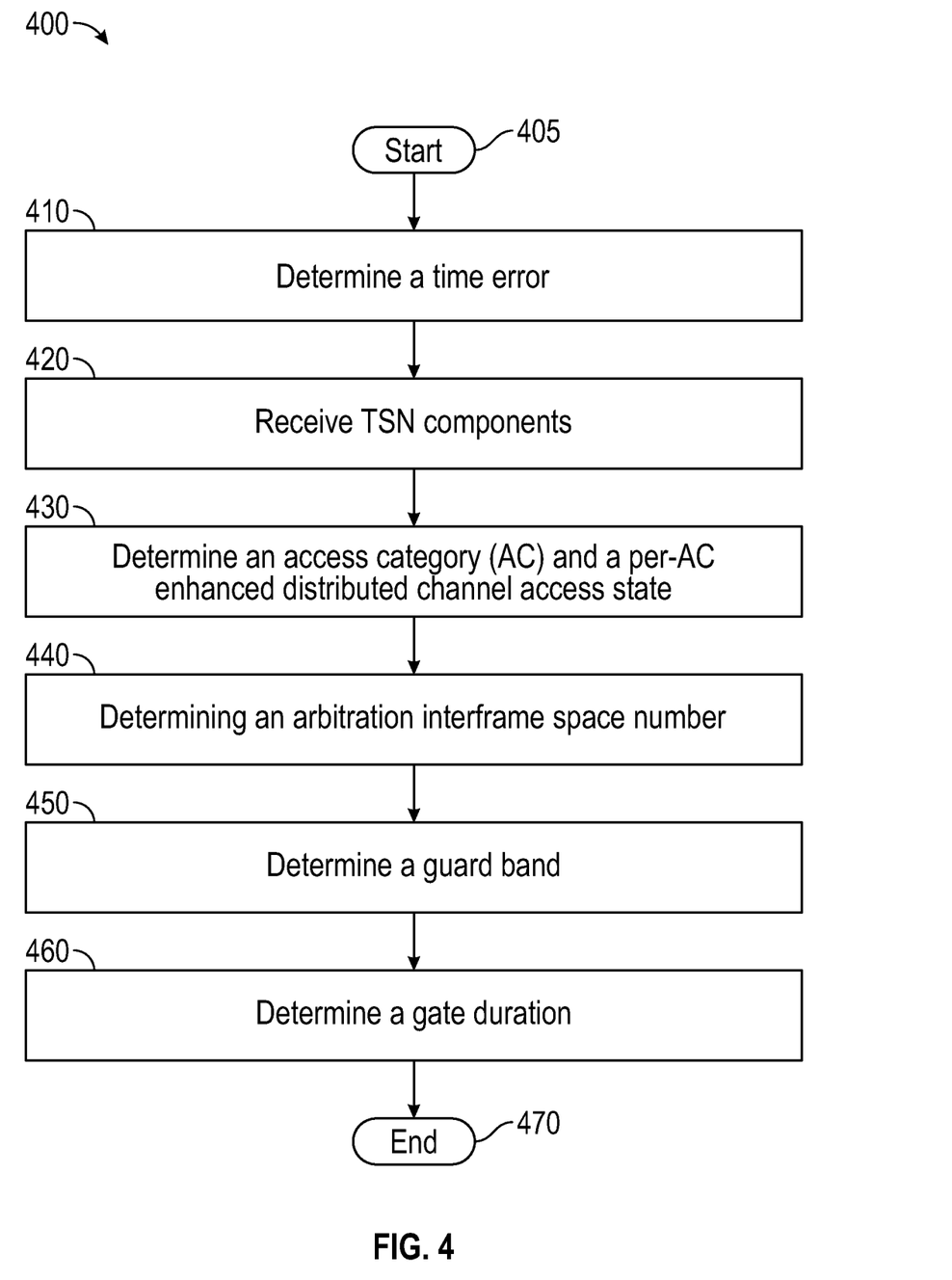
FIG. 4 is another flow chart of a method for determining the components for TSN.

FIG. 4 is a flow chart of another method 400 for determining the components for TSN. The method 400 may begin at starting block 405 and proceed to operation 410, and a TE may be determined by the CNC 110 for example. In operation 420, TSN components may be received. For example, the CNC 110 receives the TSN components including a TID.

In operation 430, an AC and a per-AC EDCA state may be determined. For example, the CNC 110 determines the AC and the per-AC EDCA state using the TID. The per-AC EDCA may include a CW minimum.

In operation 440, AIFSN of an upcoming data unit may be determined. For example, the CNC 110 determines the AIFSN of an upcoming PPDU using the using the AC and per-AC EDCA.

In operation 450, the GB may be determined. For example, the CNC 110 determines the GB based on the AIFSN, the CW minimum, and the TE. The CNC 110 may determine the GB using the operations described above with respect to FIG. 1 and FIG. 2.

In operation 460, the GD may be determined. For example, the CNC 110 may determine the GD based on the TE and calculating a number of symbols in a MAC Protocol Data Unit (MPDU) and the upcoming data unit (e.g., PPDU). The CNC 110 may determine the GD using the operations described above with respect to FIG. 1 and FIG. 2.

Figure 5:
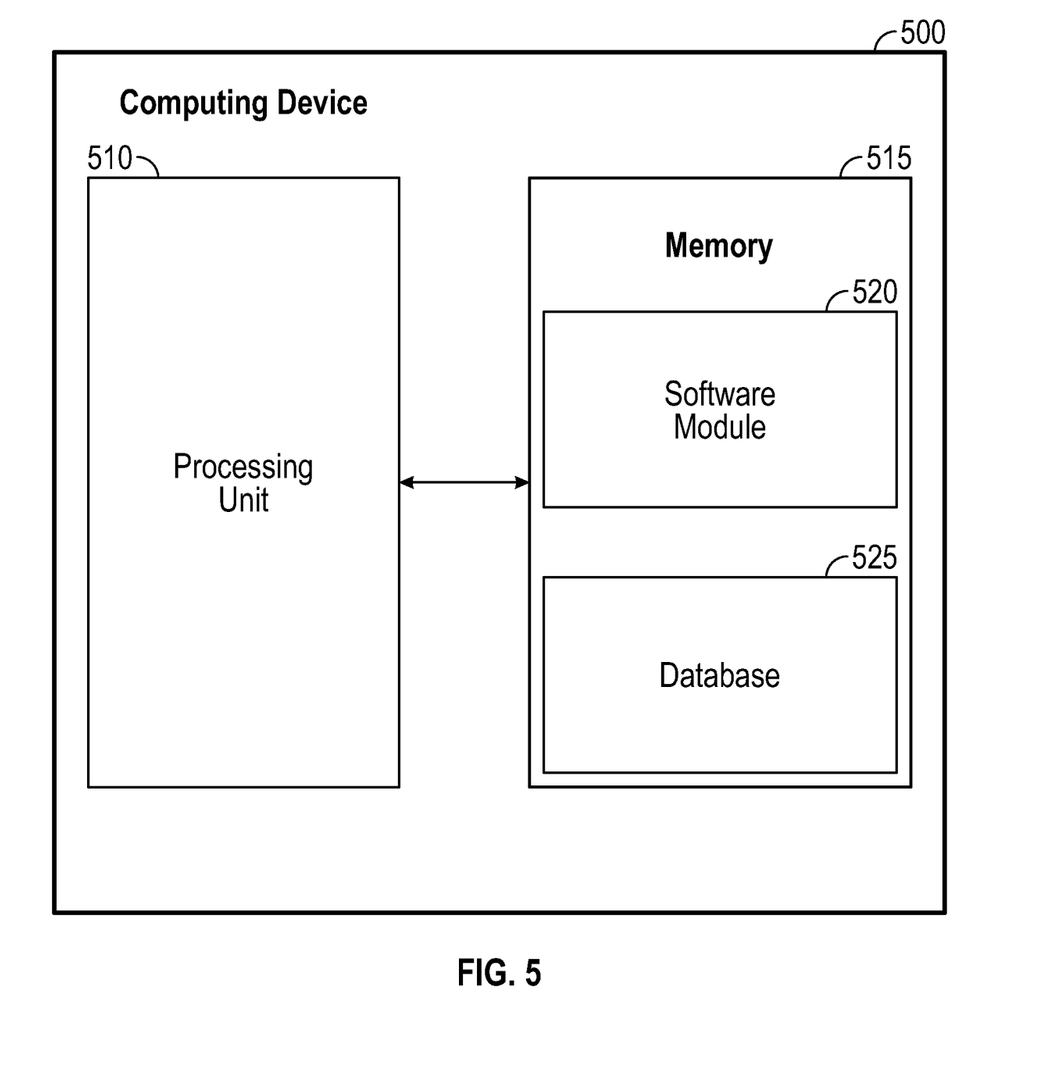
FIG. 5 is a block diagram of a computing device.

FIG. 5 is a block diagram of a computing device 500. As shown in FIG. 5, the computing device 500 may include a processing unit 510 and a memory unit 515. Memory unit 515 may include a software module 520 and a database 525. While executing on processing unit 510, the software module 520 may perform, for example, processes for providing the automatic determination of components for TSN with respect to FIG. 1, FIG. 2, FIG. 3, and FIG. 4. Computing device 500, for example, may provide an operating environment for the CNC 110, the first AP 120, the second AP 125, the first STA 130, the second STA 132, the third STA 134, the fourth STA 136, and/or any other system described herein. The CNC 110, the first AP 120, the second AP 125, the first STA 130, the second STA 132, the third STA 134, the fourth STA 136, and/or any other system described herein may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   determining a Time Error (TE) using bi-directional time synchronization;
   receiving Time Sensitive Networking (TSN) components, the TSN components including any of (i) a scheduling interval, (ii) a start time, (iii) a Traffic Identifier (TID), (iv) a size of a data unit, or (v) any combination of (i)-(iv);
   considering a status of a network; and
   determining a Guard Band (GB) and a Gate Duration (GD) based on the TE, the traffic specifications, and the status of the network.

2. The method of claim 1, wherein considering the status of the network comprises:
   determining an Access Category (AC) and a per-AC Enhanced Distributed Channel Access (EDCA) state using the TID, wherein the per-AC EDCA includes a Contention Window (CW) minimum; and
   determining an Arbitration Interframe Space Number (AIFSN) of an upcoming data unit using the using the AC and per-AC EDCA.

3. The method of claim 2, wherein determining the GB and GD comprises:
   determining the GB based on the AIFSN, the CW minimum, and the TE; and
   determining the GD based on the TE and calculating a number of symbols in a MAC Protocol Data Unit (MPDU) and the upcoming data unit.

4. The method of claim 2, wherein the upcoming data unit is a Physical Layer Protocol Data Unit (PPDU).

5. The method of claim 1, further comprising:
   determining a probability for one or more numbers of transmission retries;
   determining a retry buffer based on the probability for one or more numbers of transmission retries; and
   adding the retry buffer to the GD.

6. The method of claim 1, further comprising:
   determining a transmission must retry; and
   causing the transmission to continue via a MPDU and no ACK SIFS cycle in response to determining the transmission must retry.

7. The method of claim 1, wherein determining the GB includes:
   determining a Physical Layer (PHY) mode, a current station (STA) data rate, and a current MAC protocol; and
   using the PHY mode, the current STA data rate, and the current MAC protocol to determine the GB.

8. A method comprising:
   determining a Time Error (TE);
   receiving Time Sensitive Networking (TSN) components, the TSN components including a Traffic Identifier (TID);
   determining an Access Category (AC) and a per-AC Enhanced Distributed Channel Access (EDCA) state using the TID, wherein the per-AC EDCA includes a Contention Window (CW) minimum;
   determining an Arbitration Interframe Space Number (AIFSN) of an upcoming data unit using the using the AC and per-AC EDCA;
   determining a Guard Band (GB) based on the AIFSN, the CW minimum, and the TE; and
   determining a Gate Duration (GD) based on the TE and calculating a number of symbols in a MAC Protocol Data Unit (MPDU) and the upcoming data unit.

9. The method of claim 8, wherein determining the TE includes using bi-directional time synchronization.

10. The method of claim 8, further comprising:
    determining a probability for one or more numbers of transmission retries;
    determining a retry buffer based on the probability for one or more numbers of transmission retries; and
    adding the retry buffer to the GD.

11. The method of claim 8, further comprising:
    determining a transmission must retry; and causing the transmission to continue via a MPDU and no ACK SIFS cycle in response to determining the transmission must retry.

12. The method of claim 8, further comprising including an auxiliary GB.

13. The method of claim 8, wherein the upcoming data unit is a Physical Layer Protocol Data Unit (PPDU).

14. The method of claim 8, wherein determining the GB includes:
   determining a Physical Layer (PHY) mode, a current station (STA) data rate, and a current MAC protocol; and
   using the PHY mode, the current STA data rate, and the current MAC protocol to determine the GB.

15. A system comprising:
   a memory storage; and
   a processing unit coupled to the memory storage, wherein the processing unit is operative to:
      determine a Time Error (TE);
      receive Time Sensitive Networking (TSN) components, the TSN components including a Traffic Identifier (TID);
      determine an Access Category (AC) and a per-AC Enhanced Distributed Channel Access (EDCA) state using the TID, wherein the per-AC EDCA includes a Contention Window (CW) minimum;
      determine an Arbitration Interframe Space Number (AIFSN) of an upcoming data unit using the using the AC and per-AC EDCA;
      determine a Guard Band (GB) based on the AIFSN, the CW minimum, and the TE; and
      determine a Gate Duration (GD) based on the TE and calculating a number of symbols in a MAC Protocol Data Unit (MPDU) and the upcoming data unit.

16. The system of claim 15, wherein the processing unit being operative to determine the TE comprises the processing unit being operative to use bi-directional time synchronization.

17. The system of claim 15, wherein the processing unit is further operative to:
   determine a probability for one or more numbers of transmission retries;
   determine a retry buffer based on the probability for one or more numbers of transmission retries; and
   add the retry buffer to the GD.

18. The system of claim 15, wherein the processing unit is further operative to:
   determine a transmission must retry; and
   cause the transmission to continue via a MPDU and no ACK SIFS cycle in response to determining the transmission must retry.

19. The system of claim 15, wherein the processing unit is further operative to:
   determine a Physical Layer (PHY) mode, a current station (STA) data rate, and a current MAC protocol; and
   use the PHY mode, the current STA data rate, and the current MAC protocol to determine the GB.

20. The system of claim 15, wherein the upcoming data unit is a Physical Layer Protocol Data Unit (PPDU).

* * * * *